UNITED STATES PATENT OFFICE.

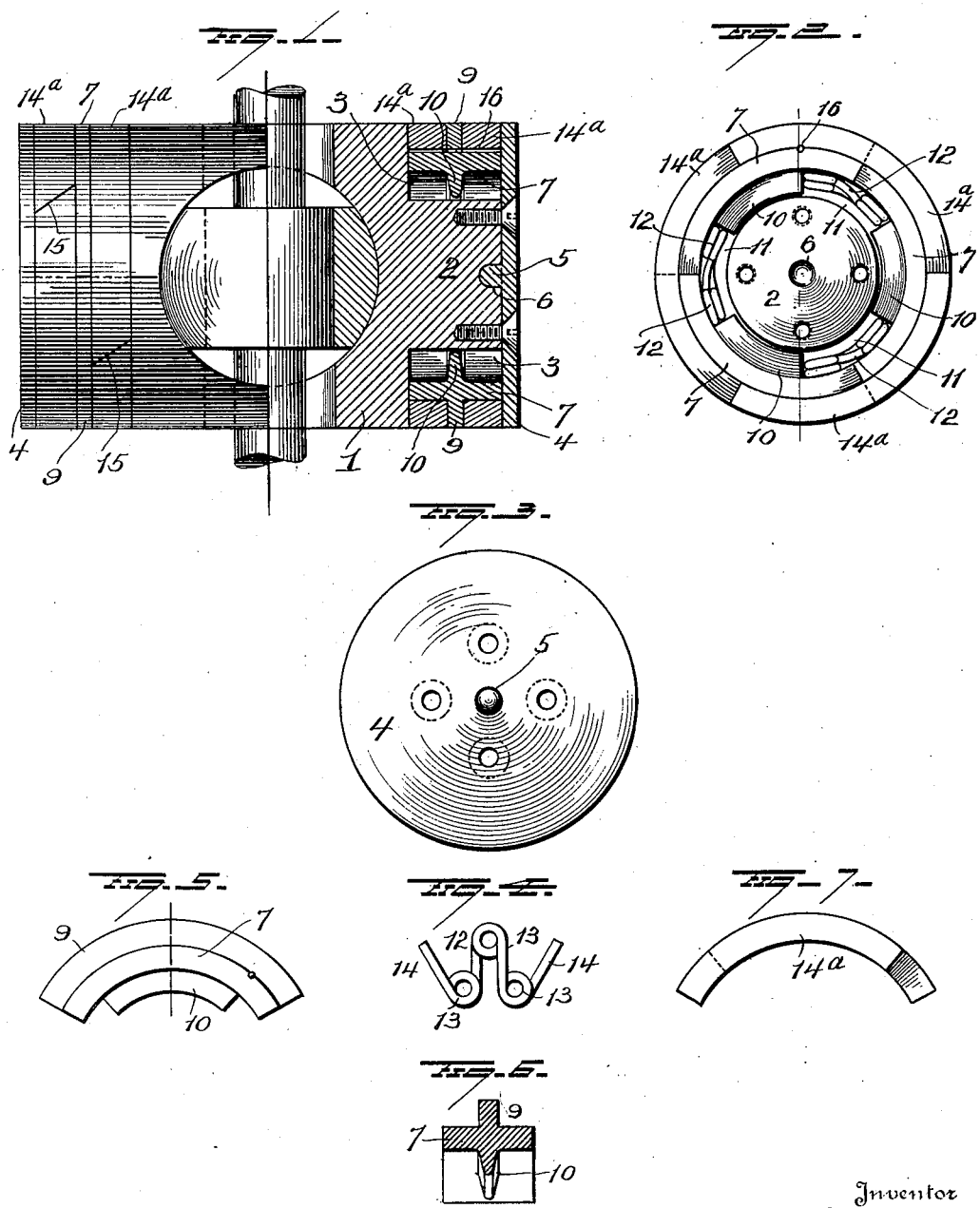

ALFRED S. LEWIS, OF WEST CHESTER, PENNSYLVANIA.

PISTON PACKING.

1,412,947.  Specification of Letters Patent.  Patented Apr. 18, 1922.

Application filed June 8, 1920. Serial No. 387,455.

*To all whom it may concern:*

Be it known that I, ALFRED S. LEWIS, a citizen of the United States, and a resident of West Chester, in the county of Chester and State of Pennsylvania, have invented certain new and useful Improvements in Piston Packing; and I do hereby declare the following to be a full, clear, and exact description of the invention, such as will enable others skilled in the art to which it appertains to make and use the same.

This invention relates to improvements in piston packing,—the object of the invention being to provide improved packing wherein the joints between the segments shall be broken in two directions at substantially right angles to each other whereby leakage past the piston in a machine, such as a compressor for refrigerating apparatus shall be effectually avoided.

With this and other objects in view, the invention consists in certain novel features of construction and combinations of parts as hereinafter set forth and pointed out in the claim.

In the accompanying drawings; Figure 1 is a view, partly in section, of a piston, showing an embodiment of my invention; Figure 2 is an end view with the follower head removed; Figure 3 is a view of a follower head, and Figures 4, 5, 6 and 7 are detail views.

In the drawing I have illustrated a double-acting piston such as may be employed for use in a gas compressor, but my improvements are also adaptable for use with a single-acting piston. The construction and application of the packing devices are the same at respective ends of the piston and a detail description of such construction at one end of the piston will suffice for both.

1 represents the body of the piston which is made with a reduced end portion 2 to form an annular recess 3 wherein the packing devices are located,—one side of said recess being formed by a follower head or plate 4 screwed to the end of the piston and having a centering pin 5 to enter a socket 6 in the piston.

In constructing the packing devices, I employ a base ring 7 comprising a plurality of sections (three such sections being shown in the drawing). The base ring 7 has a diameter appreciably less than that of the piston, except for a central outwardly projecting rib 9, the outer face of which latter is approximately flush with the outer face of the body of the piston,—each section of the base ring being provided with such a rib. The several sections of the base ring 7 are made with centrally located ribs 10 projecting from the inner face of said sections, and these ribs 10 are made appreciably shorter than the sections of said base ring, so that when the several sections shall have been assembled, pockets 11 will be formed. In these pockets, springs 12 are located, each of said springs preferably being formed of a single piece of wire bent to form a plurality of connected coils 13 and arms or terminals 14 which bear against the ends of the ribs 10 of adjacent base ring sections.

Encircling the base ring 7 at respective sides of the rib 9, are packing rings $14^a$, $14^a$, each comprising a plurality of sections or segments and these packings are so disposed that the diagonal joints 15 formed by the sections, will not align with the joints formed by the sections of the base ring. In order to insure such relative positions of the rings 14 and base rings, slipping of said rings $14^a$ is prevented by locking pins 16 which enter aligning grooves in the base ring 7 and packing rings $14^a$.

With the construction and arrangements of the packing devices as above described, the joints of the sections or segments are broken in two directions at right angles to each other and the parts are so disposed that the packing as a whole will operate effectually to prevent leakage past the piston, and this is an important consideration in such machines as gas compressors.

Slight changes might be made in the details of construction of my invention without departing from the spirit thereof or limiting its scope, and hence I do not wish to restrict myself to the precise details herein set forth.

Having fully described my invention what I claim as new and desire to secure by Letters-Patent. is:—

Packing devices comprising a sectional base ring having outwardly projecting central rib portions, and the several sections of said base ring having inwardly projecting ribs, each shorter than the section from which it projects whereby pockets are formed when the sections are assembled, springs in said pockets and having parts bearing against the ends of inwardly projecting ribs of adjacent base ring sections, and sectional packing rings mounted on the base ring at respective sides of the outwardly projecting rib portions thereon.

In testimony whereof, I have signed this specification in the presence of two subscribing witnesses.

ALFRED S. LEWIS.

Witnesses:
T. WALTER HANNUM,
C. H. H. LEWIS.